United States Patent [19]

Ledenbach

[11] Patent Number: 4,722,005

[45] Date of Patent: Jan. 26, 1988

[54] SOFTWARE CONTROLLABLE HARDWARE CRT DIMMER

[75] Inventor: Gregory W. Ledenbach, Orangevale, Calif.

[73] Assignee: Intel Corporation, Santa Clara, Calif.

[21] Appl. No.: 906,800

[22] Filed: Sep. 12, 1986

[51] Int. Cl.[4] .......................... H04N 5/57; H04N 5/68

[52] U.S. Cl. .................................... 358/168; 358/174; 358/220; 340/793

[58] Field of Search ............... 358/168, 160, 174, 220, 358/83, 243; 340/793, 799

[56] References Cited

U.S. PATENT DOCUMENTS 4,223,353 9/1980 Keller ................................. 358/168

4,494,137 1/1985 Freyberger ......................... 358/168

*Primary Examiner*—Tommy P. Chin

*Attorney, Agent, or Firm*—Blakely, Sokoloff, Taylor & Zafman

[57] ABSTRACT

An apparatus for controlling a video display on a viewing screen such that it will not burn in the screen when the image is left unchanged for a prolonged period of time. A software controlled dimming circuit implements a shifting operation to the digital signal when activated. The shifting results in a lowering of intensity of the screen, yet retaining the original image on the screen.

15 Claims, 3 Drawing Figures

SOFTWARE CONTROLLABLE HARDWARE CRT DIMMER

BACKGROUND OF THE INVENTION

1. Field of the Invention

The present invention relates to the field of displaying information on a visual device. More specifically, the present invention relates to an apparatus for reducing the display intensity of a screen of a cathode ray tube.

2. Prior Art

In a typical display screen utilizing a cathode ray tube (CRT) to provide a visual display, an unchanging image on the screen will tend to burn that image into the CRT. The video image which results from a high-intensity beam striking the back face of the CRT screen cause the presentation of images on the front of the screen. However, when this high-intensity beam continues to provide an unchanging pattern on the screen for a prolonged period of time, the particular image is permantly "burned-in" on the screen. The burned-in image is quite noticeable even when the CRT is completely deactivated. Normally, this problem results when a video terminal is left unattended for a prolonged period of time, wherein a video pattern is unchanging during this unattended period.

To prevent this burn-in of the CRT, various "screen saver" functions have been implemented in video terminals in the prior art. A typical screen saver funtion implements a circuit for monitoring an interactive device, such as a keyboard. If no interaction has occured for a given period of time, the circuit interacts with the contrast control of the CRT and blanks the screen. Although the blanking function removes high-intensity video images from the CRT, it also leaves the video screen blank. Leaving the screen in the blank mode is disadvantageous because it is difficult to tell if the screen is on or off. Instead of proceeding to a blanking mode, another prior art method never permits the pattern to remain constant once the screen saver function is activated. In this instance colors are changed every few seconds, or a pattern is made to float across the screen randomly preventing any stationary image to remain on the screen.

It is appreciated then, that what is needed is a screen saver function which provides a continuous and unchanging video pattern which will not burn-in the CRT screen.

SUMMARY OF THE INVENTION

The present invention describes an apparatus for controlling a video display on a CRT screen such that it will not burn in the screen when the image in left unchanging for a prolonged period of time. The present invention implements a video digital-to-analog converter which has a dimming function to provide a reduced intensity display to the terminal. The present invention allows hardware dimming and blanking of a video display under software control. A right shift of two bits with a padding by zeroes causes an approximately 75% decrease in the intensity of the screen without significantly changing the existing image. The embodiment of the present invention is incorporated in a semiconductor device which is used to control the colors of the pixels of a video display.

DETAILED DESCRIPTION OF THE INVENTION

The present invention discloses an apparatus for providing a screen saver funtion in a video terminal. In the following description, numerous specific details are set forth such as the use of a specific bit pattern, specific replication of circuits, etc., in order to provide a thorough understanding of the present invention. However, it will be apparent to one skilled in the art that the present invention may be practiced without these specific details. In other instances, well-known devices and control lines have not been described in detail in order not to unnecessarily obscure the present invention.

Figure 1:
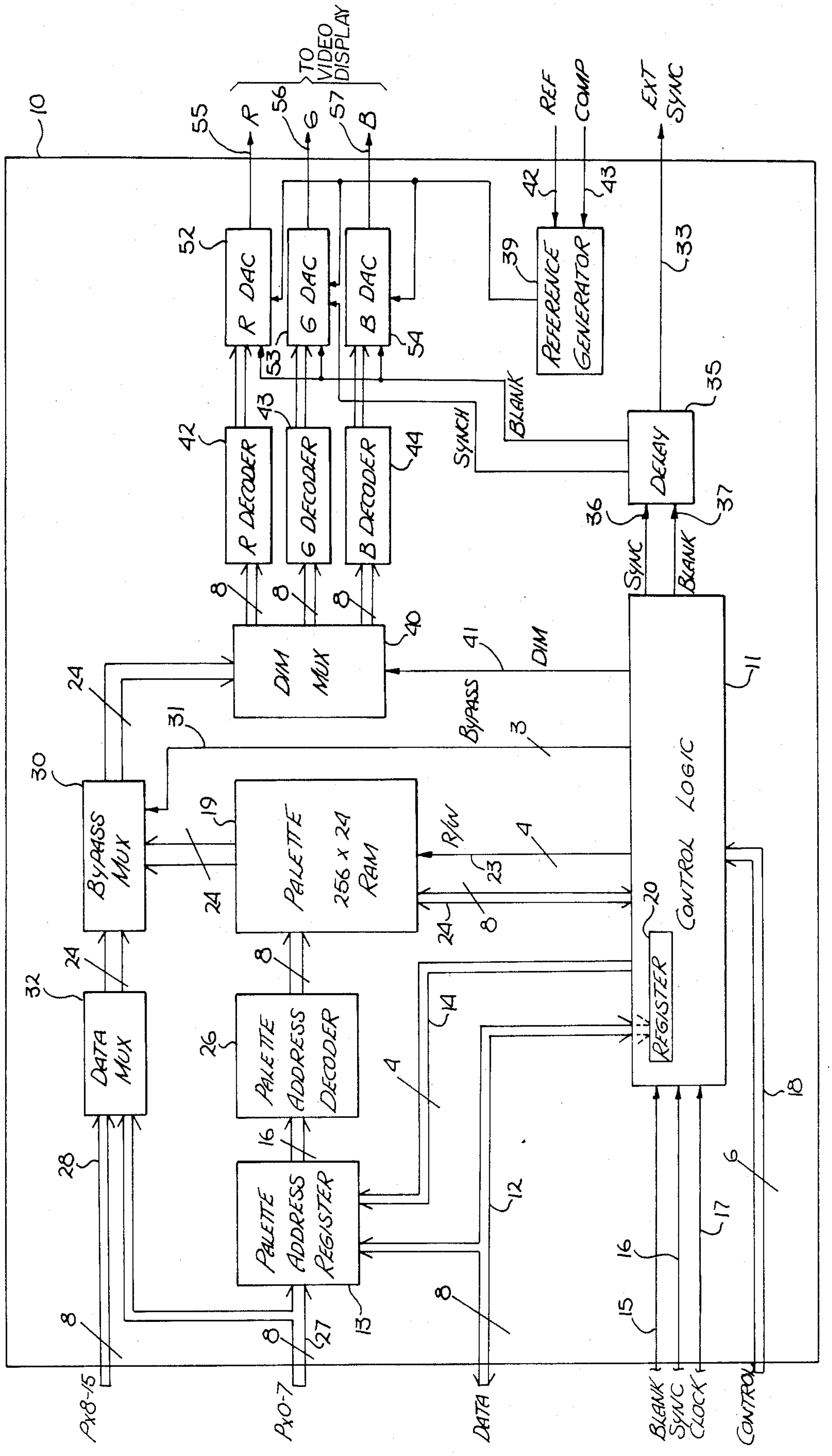
FIG. 1 is a block diagram showing the elements of the present invention incorporated in to a semiconductor chip.

Referring to FIG. 1, a triple 8-bit video palette and digital-to-alalog converter (DAC) circuit embodying the present invention is shown. A data bus 12 is coupled to a control logic 11 and to a palette address register 13. Control logic 11 also accepts signals on lines 15, 16 and 17, as well as on processor control lines 18. Further, control logic 11 provides control signals to palette address register 13 on lines 14 and control signals to palette 19 on lines 23 and bus 24. Control logic 11 is also coupled to bypass multiplexer (MUX) 30 on bypass lines 31, to dim MUX 40 by line 41 and to delay circuit 35 by lines 36 and 37. Palette address register 13 is coupled to palette address decoder 26 which is then coupled to palette 19. Eight-bits of pixel information ($P_x$0–7) are coupled to palette address register 13 and to data MUX 32 on lines 27. A further 8-bits ($P_x$8–15) of pixel information are coupled to data MUX 32 on lines 28. Bypass MUX 30 accepts the output of data MUX 32 and the output of palette 19, and then couples one of these outputs to dim MUX 40. Dim MUX 40 provides an output to Red (R) decoder 42, Green (G) decoder 43 and Blue (B) decoder 44, wherein these decoder 42,43 and 44 outputs are coupled to R DAC 52, G DAC 53 and B DAC 54 respectively. R DAC 52, G DAC 53 and B DAC 54 receive a blanking signal from delay circuit 35 and a reference signal from reference generator 39. Delay circuit 35 also provides a synchronizing signal to G DAC 53. R, G and B analogue signals consistent with the RS-343A standard are outputted from R DAC 52, G DAC 53 and B DAC 54, respectively. Reference generator 39 is coupled to external devices (not shown) on lines 42 and 43.

Structurally, the various elements as described above are implemented on a single semiconductor chip 10 as shown by the rectangle enclosing the various blocks and lines. The semiconductor chip 10 of the present invention is packaged in a 44-pin surface mount package which generates an RS-343A compatible red, green and blue (R,G,B) video signals on lines 55, 56 and 57 and drives a doubly-terminated 75-ohm Coax directly, allowing for an easy interface to a color monitor. Although such a highly integrated device is disclosed, it is appreciated that such integration is not necessary to practice the present invention.

In operation, control logic 11 receives a blanking signal on line 15, a synchronizing (sync) signal on line 16 and a clocking signal on line 17, as well as being interfaced to a processor, such as a microprocessor on lines 18. Control logic 11, which also includes a register 20 for receiving data signals from bus 12, provides various control signals and sequences for controlling the other circuits within device 10. The control logic 11 also provides a sync signal and a blanking signal on lines 36 and 37 to delay circuit 35. Delay circuit 35 provides an appropriate synchronizing and blanking signals to the DACs 52–54 after providing proper pipeline delay. Delay circuit 35 also generates an external sync to synchronize the actual display on line 33.

Palette 19 of the present invention is a 256×24 random-accessmemory (RAM), which can store 256 color signals, wherein each color signal is 24 bits long. Color information is loaded into the pallette 19 by providing 8-bit color words on bus 12 to control logic 11. The color data is then transmitted on bus 24 from control logic 11 to palette 19. The necessary control signals are passed between control logic 11 and palette 19 on lines 23. A write signal on one of lines 23 permits the writing of colored data into palette 19 through bus 24. The addressing of palette 19 is provided by palette address register 13 and palette address decoder 26. The control logic 11 after receiving appropriate control signals will initialize palette address register 13. Palette address register 13 accepts 8-bit inputs and generates a 16-bit output to palette address decoder 26. Palette address decoder 26 then decodes the input to an 8-bit palette addressing signal to access palette 19. The 8 bit addressing signal from palette address decoder 26 accesses palette 19 for both read and write functions. When palette 19 is being loaded, a write signal on one of lines 23 and a sequencing address signal on bus 14 will load 256 colors into palette 19.

When palette 19 is to be accessed to provide color information to the display, the pixel information is provided as an 8-bit signal on lines 27. $P_x$0–7 signal is inputted to the pallet address register 13 and then fed to the palette address decoder 26. The 8 bit $P_x$0–7 signal selects one of the 256 addresses within palette 19. When pixel information is to be displayed, a read signal is generated on one of lines 23 from control logic 11. Palette 19 will then generate a 24-bit color signal as an output from palette 19 to bypass MUX 30. The color signal is then passed on to dim MUX 40 and then to the decoders 42–44.

Alternatively, $P_x$0–7 pixel information may be inputted directly to data MUX 32 which is then outputted to bypass MUX 30 as 24 bits of data consisting of three 8-bit words. The bypass MUX 30 is capable of multiplexing between one of two input signals; one from data MUX 32 and the other from palette 19 and selecting one of those outputs to dim MUX 40. Also, in addition, data MUX 32 is capable of receiving $P_x$8–15 pixel signals on lines 28 and combines them with 8-bits from $P_x$0–7 to provide a $P_x$0–15 signal. Further, data MUX 32 generates internal fill-in codes to generate an output signal which is 24 bits. Hence, data MUX 32 always generates 24 bits to bypass MUX 30. Therefore, bypass MUX 30 selects pixel data from information stored in palette 19, or directly passes pixel data presented on line 27 or both lines 27 and 28 mapped to 24 bits.

Bypass MUX 30 generates 24-bits to dim MUX 40. Dim MUX 40 separates the video signal to its R, G and B components for output to decoders 42–44. Dim MUX

40 also receives a dim signal on line 41 from control logic 11 to activate the dimmer function when desired.

The 8-bits to each of the decoders 42–44 are decoded and passed on to DACs 52–54. Each of the decoders 42–44 generates a mixed seqmented/binary weight signal to DACs 52–54. The 6 MSB's are segmented, the 2 LSB's are binary weighted. Since 24 bits are always inputted to DECODERS 42–44 $2^{24}$ color combinations are available on lines 55–57.

The preferred embodiment actually has three different modes of operation for the bypass MUX 30. In the first mode, when a gray-tone coloration is desired, 8-bits are passed from $P_x$0–7 to each of decoders 42–44 and on to its corresponding DACs 52–54. In the second mode, which is intended to support a 16-bit per pixel input, the 16 bits are split into R, G and B groups of 5,6 and 5 bits, respectively. The DATA MUX 32 supplies the padding to convert the 16 bits to the appropriate 24 bit combination. In the third mode, which also is intended as a support for 16-bits per pixel, the 16 bits are split into R, G and B groups of 6,6 and 4 bits respectively. The Data MUX 32 again supplies the padding to convert the 16 bits to the appropriate 24 bit combination. In the preferred embodiment, a sync signal is provided to G DAC 53 from delay circuit 35, although the sync signal may be applied to any of the color DACs. The reference generator requires an external reference resistor and a compensation capicitor on lines 42 and 43 to generate an internal reference signal to the DACs 52–54.

Figure 2:
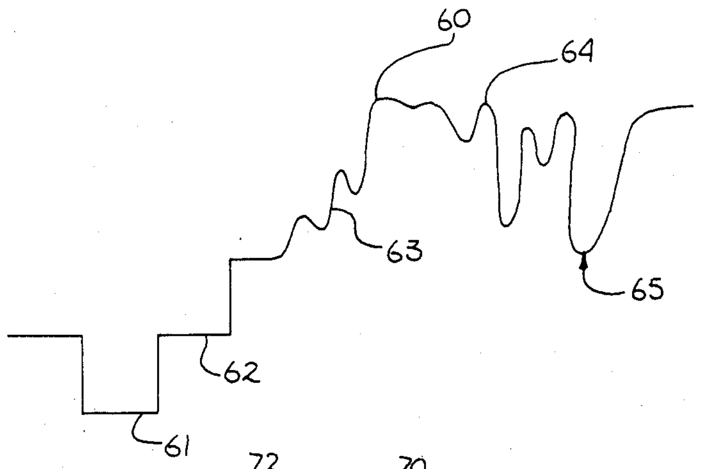
FIG. 2 is a graphic representation of a typical composite video signal.

Referring to FIG. 2, a composite video signal 60 is shown. Video signal 60 has a horizontal sync pulse 61, a horizontal blanking pulse 62 and video portion 63. The peak portion 64 of the video signal 60 represents white, while the trough portion 65 represent the black. The signal levels in between the peak 64 and trough 65 represent the variations in the black and white shading and is called the DAC active range. The signal level (voltage level) of the horizontal blanking pulse 62 is at a still lower level in comparison to the voltage level of the black color. Therefore, when the display is under the blanking control, it is typically referred to as blacker-than-black, because the signal level represented by the horizontal blanking pulse 62 is much lower in magnitude than the voltage level represented by the black signal at portion 65. Ideally, what is desired is for the screen saver function to generate a voltage level which does not burn in the screen yet maintains the output in the active range.

Figure 3:
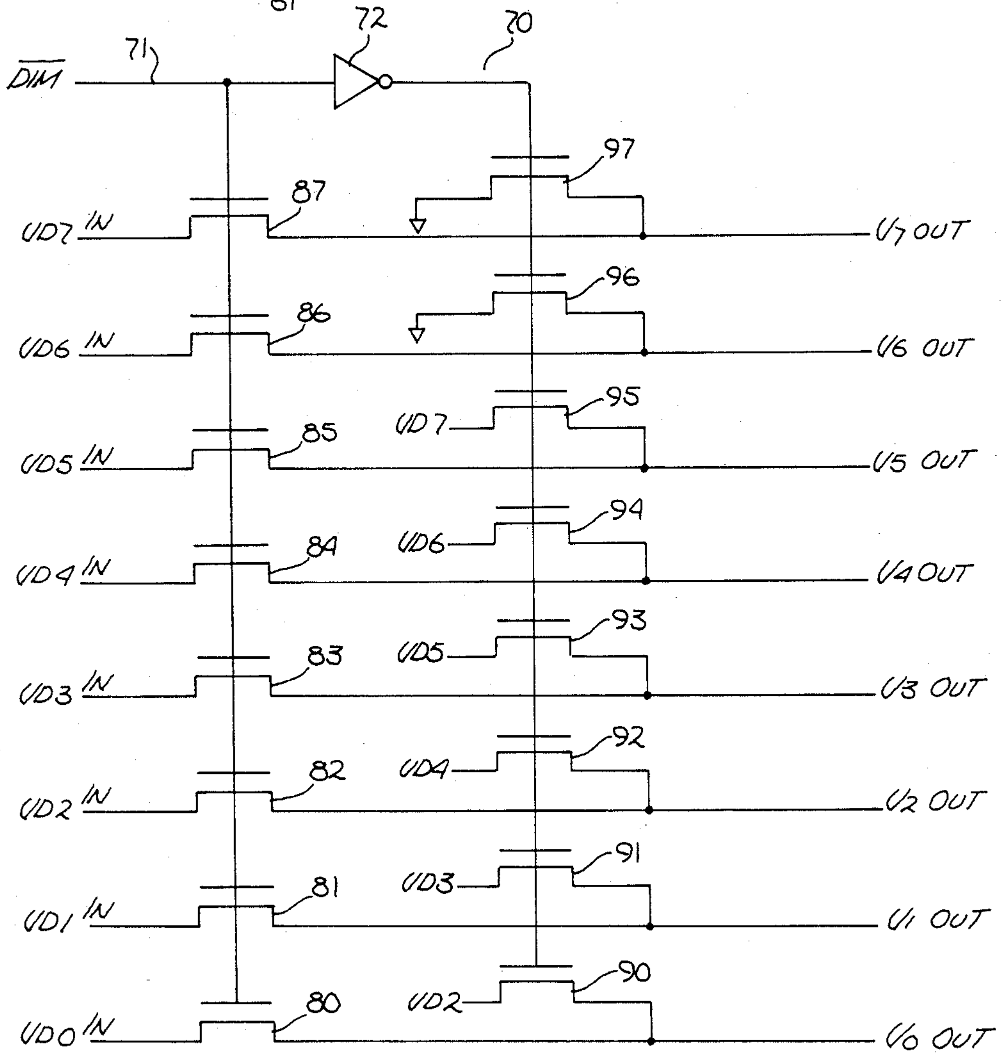
FIG. 3 is a scematic diagram showing a dimming circuit of the present invention.

Referring to FIG. 3, a circuit 70 which implements the dimming function of the present invention is shown. The circuit 70 is implemented in the dim mux 40 of FIG. 1. The circuit 70 is one of three implemented using 16 NMOS devices and an inverter. Under normal operation the dim signal on line 71 is high, activating transistors 80–87 to permit video signals VD0–VD7 to pass directly to the output which are labeled V0 OUT though V7 OUT. Therefore, video information from bypass MUX 30 of FIG. 1 are imputted to circuit 70 as three sets of VD0–VD7. Under normal operation, these bits are passed directly to decoders 42–44. It is understood that only one circuit 70 is shown to control 8-bits, but in reality three such circuits 70 are used to control three groupings of 8-bits, each for controlling all 24 bits from bypass mux 30. Each grouping of V0–V7 OUT bits are further manipulated in decoders 42–44 of FIG. 1, but V0–V7 OUT represent binary weighted values which translate to a voltage level for controlling the intensity of each of the R, G and B signals.

When dimming is desired the dim signal on line 71 goes low and deactivates transistors 80–87, but due to inverter 72, activates transistors 90–97. In the dim mode VD0 and VD1 are not used and signals VD2 through VD7 are downshifted two lines. Therefore, VD2 is now present on V0 OUT and respectively VD7 is now present on V5 OUT. A ground is placed on lines V6 and V7 OUT due to transistors 96 and 97 which are tied to electrical ground. Hence, the end result is a right shift with a zero fill occuring to the original video signal. In mathematical terms, this translates to an approximate decrease of 75% of the binary weight of the voltage level, resulting in an approximately equivalent reduction in the intensity level of the display screen.

The right shift with a zero fill operation reduces the intensity level of the CRT screen by reducing each of the R, G and B driving signals by approximately 75%. Because all three R, G and B driving signals are reduced equivalently, only the intensity is affected. The image which is present on the screen is still present in a "dimmed" mode and perceived by the eye as a dimmer image. This dim mode indicates to the operator that the screen is active, but prevents the burn-in of the image due to its low intensity.

The dim mode is activated by a novel approach of using software to control the dimming function. The operator may use the dimming funtion as part of his program in controlling the display. The software instruction is transferred to the control logic 11 of FIG. 1 by microprocessor control on lines 18 via the data bus 12, loading the instruction into register 20. The dimming function can be activated by a variety of prior art blanking activation methods as well.

Thus a software controllable hardware CRT dimmer is described.

I claim:

1. An apparatus for controlling a video display comprising:

a memory for storing digital signals representative of video data;

a dimming circuit coupled to receive an output from said memory, said dimming circuit passing said stored digital signals from said memory as first output digital signals representing a video image when a dimming function is not used and said dimming circuit converting said stored digital signals by shifting said stored digital signals a predetermined number of bit position, wherein said shifted stored digital signals provide second output digital signals representing a lower intensity image when said dimming function is used;

a digital-to-analog converter (DAC) coupled to said dimming circuit for receiving and converting said output digital signals to analog video signals;

control means coupled to control said memory, dimming circuit and DAC, and to activate said dimming function;

whereby said video display shows said lower intensity image when said dimming function is activated.

2. The apparatus as defined in claim 1, further including addressing means coupled to said memory for accessing said memory.

3. The apparatus as defined in claim 2, wherein said memory is a random-access-memory.

4. The apparatus as defined in claim 3, wherein said analog video signals at the output of said DAC are analog red-green-blue (R,G,B) signals.

5. The apparatus as defined in claim 4, wherein said control means includes a register, said register for storing a predetermined control signal which activates said dimming function.

6. The apparatus as defined in claim 5, wherein said register is programmable.

7. The apparatus as defined in claim 6 wherein said apparatus is implemented in an integrated semiconductor device.

8. An apparatus for controlling a display of a video viewing screen comprising:

a memory for storing digital signals representative of video data and which control pixels of said display;

addressing means coupled to said memory for accessing said memory;

a dimming circuit coupled to receive an output from said memory, said dimming circuit passing said stored digital signals from said memory as first output digital signals representing a video image when a dimming function is not used and said dimming circuit converting said stored digital signals by shifting said stored digital signals a predetermined number of bit position wherein said shifted stored digital signals provide second output digital signals representing a lower intensity image when said dimming function is used;

a plurality of digital-to-analog converters (DACs) coupled to said dimming circuit for receiving and converting said output digital signals to analog red-green-blue (R,G,B) video signals;

control means coupled to control said memory, dimming circuit and DACs, for activating said dimming function of said dimming circuit;

whereby said video display shows said lower intensity image on said screen when said dimming function is activated.

9. The apparatus as defined in claim 8, wherein said dimming circuit further including a multiplexer; said multiplexer passing said stored digital signals to said DACs as first output digital signals when said dimming function is inactive; and said multiplexer converting said stored digital signals to said second output digital signals to said DACs when said dimming function is activated.

10. The apparatus as defined in claim 8, wherein said dimming circuit provides said conversion by shifting bits to a lesser significant bit position and predetermined number of bit position and padding vacated more significant bit positions with zeros.

11. The apparatus as defined in claim 10, wherein said control means includes a register, said register for storing a predetermined control signal which activates said dimming function.

12. The apparatus as defined in claim 11, wherein said register is programmable.

13. The apparatus as defined in claim 12, wherein said apparatus is implemented in an integrated semiconductor device.

14. The apparatus as defined in claim 13, wherein said memory is a random-access-memory.

15. A method of providing a dimmed image to prevent permanent retention of such image on a video display screen, comprising the steps of:

storing digital signals representative of a video image in a memory;

accessing said stored digital signals for displaying said image;

converting said stored digital signals to a lower binary weighted value by shifting bits to a lesser significant bit position a predetermined number of bit positions and padding vacated more significant bit positions with zeroes when dimming is desired;

converting said digital signals to analog video signals;

whereby lower intensity image represented by said analog video signals is displayed.

* * * * *